United States Patent [19]

Vestergaard

[11] 4,115,358

[45] Sep. 19, 1978

[54] PROCESS FOR PREPARING AROMATIC CARBONATE POLYMERS

[75] Inventor: Jorgen H. Vestergaard, Mount Vernon, Ind.

[73] Assignee: General Electric Company, Pittsfield, Mass.

[21] Appl. No.: 720,127

[22] Filed: Sep. 3, 1976

Related U.S. Application Data

[63] Continuation of Ser. No. 302,103, Oct. 30, 1972, abandoned, which is a continuation-in-part of Ser. No. 28,055, Apr. 13, 1970, abandoned.

[51] Int. Cl.$^2$ .............................................. C08G 63/62
[52] U.S. Cl. .................................................... 528/196
[58] Field of Search ........................... 260/47 XA, 463

[56] References Cited

U.S. PATENT DOCUMENTS

| | | |
|---|---|---|
| 3,248,366 | 4/1966 | Schmidt et al. ................. 260/47 XA |
| 3,275,601 | 9/1966 | Schnell et al. .................. 260/47 XA |
| 3,386,954 | 6/1968 | Schnell et al. .................. 260/47 XA |
| 3,410,823 | 11/1968 | Cleveland et al. ............. 260/47 XA |
| 3,466,260 | 9/1969 | Bostian et al. .................. 260/47 XA |
| 3,468,846 | 9/1969 | Bottenbruch et al. ......... 260/47 XA |

*Primary Examiner*—Theodore E. Pertilla
*Attorney, Agent, or Firm*—Salvatore C. Mitri; William F. Mufatti

[57] ABSTRACT

A process for preparing a polycarbonate, which polycarbonate has improved resistance to thermal degradation and improved impact resistance and consists of reacting at least 70 weight percent of a stoichiometric amount of a carbonate precursor such as phosgene with a dihydric phenol such as bisphenol-A while simultaneously adding to the reaction medium an alkali metal hydroxide such as sodium hydroxide to maintain a pH of 6.0 to about 10.0. The pH is then raised to 11.0 by adding sufficient alkali metal hydroxide.

5 Claims, No Drawings

PROCESS FOR PREPARING AROMATIC CARBONATE POLYMERS

This is a continuation of application Ser. No. 302,103, filed Oct. 30, 1972, now abandoned, which is a continuation-in-part of U.S. patent application Ser. No. 28,055, filed Apr. 13, 1970, now abandoned.

This invention is directed to a process for preparing aromatic carbonate polymers having improved properties of thermal stability and of impact resistance.

BACKGROUND OF THE INVENTION

In recent years a great deal of effort has been expended in the area of polycarbonates in order to improve both physical and mechanical properties. Much, if not all, of this effort, as disclosed by the art, has been directed to incorporating various additives as a means of improving such properties as thermal stability, resistance to discoloration, greater impact resistance, melt viscosity stability, resistance to degradation of the polycarbonate, and various other properties. In fact, some of the art has been directed to controlling molecular weight as a means of providing uniform properties in a batch process or in a continuous process. These are U.S. Pat. Nos. 2,970,131 and 3,318,845. However, the control of molecular weight alone does not provide for improved properties.

DESCRIPTION OF THE INVENTION

It has now been surprisingly discovered that by controlling the process conditions when preparing a carbonate polymer in an aqueous caustic system produces a polycarbonate resin having improved properties of thermal stability and of impact resistance. This is surprising in itself because it does not require the need for additives as a way of improving the properties of a polycarbonate material. As is well known in the art, additives used to benefit one property can cause degradation of some other property of the material. Therefore, in the practice of this invention, by merely controlling the pH of the system during the reaction to prepare the polycarbonate resin produces a polycarbonate resin having improved properties as demonstrated by melt viscosity stability and improved impact resistance.

This invention is directed to preparing an aromatic carbonate polymer having improved properties by a process which consists of reacting a dihydric phenol such as 2,2-bis (4-hydroxyphenyl) propane (hereinafter referred to as bisphenol-A) in an aqueous medium which contains therein a solvent for the carbonate polymer as formed, a catalyst and a molecular weight regulator wherein at least 70 weight percent of the stoichiometric quantity of a carbonate precursor such as phosgene is added to the reaction medium while simultaneously adding therewith sufficient alkali metal hydroxide to maintain the pH of the reaction medium between 6.0 and 10.0 and then adding sufficient alkali metal hydroxide to raise the pH of the reaction medium to at least 11.0 and maintaining this pH during the rest of the reaction. The polycarbonate resin so formed in solution is then recovered.

The critical feature of the instant invention is in the pH control and change of pH of the reaction medium during the reaction. The completion of the addition of the carbonate precursor is not the end of the reaction. Even after the addition of all of the carbonate precursor, there is still the building or growing of the polymer chain or further polycondensation of the material in the reaction even though all of the carbonate precursor has been added. The polymer chain growth or increase in molecular weight does not stop instantaneously upon completion of the carbonate precursor addition. The reaction or polycondensation or chain growth still continues after all of the carbonate precursor is added.

Therefore, in the practice of this invention, it is necessary that the pH be controlled between 6-10 during the addition of at least 70 weight percent of the stoichiometric quantity of the carbonate precursor. When adding the carbonate precursor such as phosgene, the reaction between the phosgene and bisphenol-A proceeds fairly rapidly. This is also referred to as phosgenation of the dihydric phenol.

PREFERRED EMBODIMENT OF THE INVENTION

The following examples are set forth to illustrate more clearly the principles and practices of this invention to those skilled in the art. Unless otherwise specified, where parts are mentioned, they are parts by weight.

EXAMPLE I 37.2 gallons of distilled water, 200 pounds of bisphenol-A, 700 ml. of thriethylamine, 1800 grams of p-tertiary butylphenol and 60 gallons of methylene chloride are charged to a glasslined reaction kettle fitted with an agitator, reflux condenser and pH electrodes. The mixture is agitated for about 10 minutes. Phosgene is then added at the rate of 100 pounds per hour along with sufficient 50% aqueous sodium hydroxide solution to maintain a pH of 11.0 during the reaction. The reaction of phosgene with bisphenol-A is complete as determined by phosgene blow-by and disappearance of free monomer.

The polycarbonate in methylene chloride solution is separated from the aqueous phase and recovered by evaporation of the solvent.

The polydispersity index is found to be 3.2 which is determined by Gel Permeation Chromatography and is the ratio of weight average molecular weight to number average molecular weight $M_w/M_n$.

EXAMPLE II 37.2 gallons of distilled water, 200 pounds of bisphenol-A, 700 ml. of triethylamine, 2200 grams of p-tertiary butylphenol and 60 gallons of methylene chloride are charged to a glass-lined reaction kettle fitted with an agitator, reflux condenser and pH electrodes. The mixture is agitated for about 10 minutes.

Phosgene is then metered into the system at a rate of 100 pounds per hour. Simultaneously therewith, a 50% aqueous sodium hydroxide solution is added to maintain the pH at 9.0. After 50 minutes, sufficient sodium hydroxide solution is added to raise the pH to 11.0 which is maintained throughout the rest of the reaction. Phosgene addition is continued for another 6 minutes at which time phosgene blow-by occurs indicating the endpoint of the reaction of phosgene with bisphenol-A. Phosgene addition is stopped and agitation is continued for an additional 10 minutes.

The polycarbonate in methylene chloride solution is separated from the aqueous phase and recovered by evaporation of the solvent.

The polydispersity index is found to be 2.68.

EXAMPLE III

Example II is repeated except that the pH is maintained at 6.0 during the first part of the reaction and then raised to 11.0 as per Example II above.

The polydispersity index is found to be 2.61.

EXAMPLE IV

Each of the polycarbonates prepared in Examples I - III are analyzed for melt viscosities as measured in poises using a Capillary Rheometer at 600° F. in a nitrogen atmosphere at a shear stress of 13.2 psi gage. The melt viscosity is determined over a 20-minute period and the change in melt viscosity is noted. The greater the difference over the 20-minute period, the greater the degradation of the polycarbonate resin. The results obtained are as follows:

|  | 5 Min. | 10 Min. | 15 Min. | 20 Min. | 42 Poise |
|---|---|---|---|---|---|
| Example I | 4280 | 4070 | 3870 | 3780 | 500 |
| Example II | 2150 | 2130 | 2120 | 2090 | 60 |
| Example III | 2340 | 2320 | 2290 | 2260 | 80 |

As shown by the above results, a polycarbonate resin prepared as in Example I has a greater degradation due to heat as determined by the drop in melt viscosity. The other polycarbonate resins are more stable as demonstrated by the minor drop in melt viscosity.

EXAMPLE V

The polycarbonate of Examples I-III are injection molded at 525° F. into test specimens of 4 inches in diameter by ⅛ inch thick.

The samples are aged in an air circulating oven for 6 months at 125° C. The test specimens are then tested for impact resistance by the drop ball method which consists of dropping a 25-pound weight equipped with a 1 inch diameter ball on the end thereof onto the center of the test specimen which is supported on a flat surface with a 3 inch diameter hole in the center of the flat surface. The energy required to break the specimens is calculated in foot/pound by multiplying the distance of drop in feet to cause breakage of the test specimen by the weight of the object being dropped. The maximum drop is a distance of 8 feet. The results are as follows:

I — broke at 16 foot/pounds.

II — did not break even after dropping weight 24 times from maximum height.

III — did not break even after dropping weight 24 times from maximum height.

EXAMPLE VI

Example II is repeated except that the pH of the reaction medium is maintained at 8.0 throughout the entire phosgene addition. After phosgene blow-by occurs, sufficient sodium hydroxide is added to the reaction medium to raise the pH to 11.0. Additional agitation is continued for about 10 min.

At precisely the point of phosgene blow-by, a sample of the reaction product is analyzed for intrinsic viscosity by dissolving the sample in dioxane at 30° C. The intrinsic viscosity is so low that no readable measurement is obtainable. This indicates essentially no polymer formation.

Five minutes after phosgene blow-by, another sample is removed from the reaction and intrinsic viscosity is found to be 0.342.

Ten minutes after phosgene blow-by, another sample is removed from the reaction and intrinsic viscosity is found to be 0.621.

Twenty minutes after phosgene blow-by another sample is removed from the reaction and intrinsic viscosity is found to be 0.621.

This now shows that the polymer is still continuing to build molecular weight even after all of the phosgene is reacted indicating that the reaction is continuing.

The instant invention is directed to a process for preparing an aromatic carbonate polymer having improved properties of thermal stability and impact resistance. These properties are achieved by the surprising discovery of merely controlling the pH. By varying the pH during the reaction, a polycarbonate is obtained having these improved properties. The instant invention consists of the process of preparing the polycarbonate resin by phosgenating a dihydric phenol wherein at least 70 weight percent of the stoichiometric quantity of phosgene in an aqueous caustic medium is added to the reaction medium, which reaction medium also contains therein a solvent for the polymer as it is formed, a catalyst and a molecular weight regulator, while simultaneously adding therewith sufficient alkali metal hydroxide to maintain the pH between 6.0 and 10.0. Additional alkali metal hydroxide is then added to raise the pH to at least 11.0 while reacting the balance of the stoichiometric quantity of the carbonate precursor with the dihydric phenol or at the completion of the addition of phosgene. The criticality of this invention is in maintaining the pH in the ranges set forth above in order to obtain an aromatic carbonate polymer having improved properties. It is interesting to note from the examples that when a polycarbonate resin is prepared in an aqueous caustic medium at a pH of 11 as shown by Example I, there is a drastic change in melt viscosity in comparison to the melt viscosity of the polycarbonate resin prepared by the process of this invention as typified in Examples II and III herein. The greater the change in melt viscosity, the greater is the degradation of the resin. Example V shows the difference in impact resistance between a polycarbonate resin prepared by the practice of the instant invention and that prepared by Example I.

As stated previously, the critical feature of the instant invention is in the pH control and change of pH of the reaction medium during the reaction. By reaction, it is meant to include even that reaction involving the polycondensation or molecular weight build-up after all of the carbonate precursor is added. The pH is maintained at 6.0 to about 10.0 during the addition of at least 70 weight percent of the stoichiometric quantity of the carbonate precursor. The pH is then raised by the further addition of alkali metal hydroxides to at least a pH of 11.0 and maintaining the pH of the reaction medium at this level during the remaining reaction which can involve adding the remaining amount of the stoichiometric quantity of carbonate precursor or at the completion of the addition of all of the carbonate precursor. The reaction may be carried out by adding more than 70 weight percent of the stoichiometric quantity of carbonate precursor with the dihydric phenol before raising the pH, but the pH must in all cases be raised to at least a pH of 11.0. Preferably, it is desirable to carry out the reaction at a pH of 6.0 to about 10.0 during the addition of 70–95 weight percent of the stoichiometric amount of carbonate precursor and then raising the pH to at least 11.0. Obviously when adding at least 70 weight percent of the stoichiometric quantity of the carbonate precursor, essentially at least 70 weight percent has reacted with the dihydric phenol. Many variations of this "split" pH process condition can be employed in the practice of this invention.

In the practice of this invention, any dihydric phenol which contains as the sole reactive group two phenolic hydroxyl groups can be employed herein. Examples of some of the dihydric phenols are bisphenols such as bis(4-hydroxyphenyl)methane, 2,2-bis(4-hydroxyphenyl) propane, 4,4-bis(4-hydroxyphenyl) heptane, etc.; and include those as disclosed in U.S. Pat. No. 3,028,365, which patent is hereby incorporated by reference. Preferably the preferred dihydric phenol employed in the practice of this invention is 2,2-bis(4-hydroxyphenyl) propane.

The carbonate precursor employed in the practice of this invention can be either a carbonyl halide or a haloformate. The carbonyl halides which can be employed herein are carbonyl bromide, carbonyl chloride, carbonyl fluoride, etc. or mixtures thereof. The haloformates suitable for use herein include bishaloformates of dihydric phenol (bischloroformates of hydroquinone, etc.) or glycols (bishaloformates of ethylene glycol, neoptentyl glycol, polyethylene glycol, etc.). Although other carbonate precursors will occur to those skilled in the art, carbonyl chloride, also known as phosgene is preferred.

The molecular weight regulators which can be employed in carrying out the process of this invention for preparing the aromatic carbonate resins can be such molecular weight regulators as phenol, cyclohexanol, methanol, paratertiarybutylphenol, parabromophenol; monofunctional organic acids, that is benzoic acid, acetic acid; and monofunctional alcohols such as methanol, ethanol. The amounts employed can generally vary between 0.5 to about 4 weight percent based on the weight of the dihydric phenol originally charged to the reaction mixture.

The polymerization catalysts also employed herein can be any of the suitable catalysts that aid the polymerization of bisphenol-A with phosgene. Suitable catalysts are tertiary amines such as for example, triethylamine, tripropylamine, n,n-dimethylaniline, quaternary ammonium compounds such as for example tetraethylammonium bromide, cetyl triethyl ammonium bromide, tetra-n-heptylammonium iodide, tetra-n-propyl ammonium bromide, tetramethylammonium chloride, tetramethyl ammonium hydroxide, tetra-n-butylammonium iodide, benzyltrimethylammonium chloride and quaternary phosphonium compounds such as for example, n-butyltriphenyl phosphonium bromide and methyltriphenyl phosphonium bromide.

The alkali metal hydroxide employed in the practice of this invention can be any of the alkali metal hydroxides selected from the groups consisting of the alkali group and earth alkali groups. Specifically, these include potassium hydroxide, sodium hydroxide, lithium hydroxide, calcium hydroxide and magnesium hydroxide.

The composition prepared by the process of this invention has utility in molding and extruding parts, sheets and films. Because of the optimum physical properties obtained by employing the unique process of the instant application, the carbonate polymers prepared by the process have greater versatility in molding.

It will thus be seen that the objects set forth above among those made apparent in the preceding description are efficiently obtained and since certain changes may be made in carrying out the above process and the composition set forth without departing from the scope of the invention, it is intended that all matters contained in the above description shall be interpreted as illustrative and not in a limiting sense.

What is claimed is:

1. A process of preparing a carbonate polymer having improved resistance to thermal degradation and improved impact resistance, which process consists of (a) mixing 2,2 bis(4-hydroxyphenyl) propane in an aqueous medium with a solvent for the carbonate polymer, a molecular weight regulator and a catalyst, (b) adding 70–95 weight percent of the stoichiometric quantity of a carbonate precursor with the 2,2 bis(4-hydroxyphenyl) propane while adding, simultaneously with the carbonate precursor, sufficient alkali metal hydroxide to maintain a pH of 6.0 to about 10.0 and (c) adding sufficient alkali metal hydroxide solution to raise the pH to at least 11.0 and (d) maintaining said pH while reacting the remaining amount of the stoichiometric quantity of the carbonate precursor.

2. The process of claim 1 wherein the carbonate precursor is carbonyl chloride.

3. The process of claim 1 wherein the alkali metal hydroxide solution is sodium hydroxide.

4. The process of claim 1 wherein the catalyst is triethylamine.

5. The process of claim 1 wherein 100 percent of the stoichiometric quantity of the carbonate precursor is added while maintaining the pH at 6.0 to about 10.0 and then adding sufficient alkali metal hydroxide to raise the pH to at least 11.0.

* * * * *